(12) United States Patent
Cavaliere et al.

(10) Patent No.: US 10,763,970 B2
(45) Date of Patent: Sep. 1, 2020

(54) ENCODING FOR OPTICAL TRANSMISSION

(71) Applicant: Telefonaktiebolaget LM Ericsson (publ), Stockholm (SE)

(72) Inventors: Fabio Cavaliere, Pisa (IT); Enrico Forestieri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 16/323,304

(22) PCT Filed: Aug. 10, 2016

(86) PCT No.: PCT/EP2016/069085
§ 371 (c)(1),
(2) Date: Feb. 5, 2019

(87) PCT Pub. No.: WO2018/028784
PCT Pub. Date: Feb. 15, 2018

(65) Prior Publication Data
US 2020/0195352 A1    Jun. 18, 2020

(51) Int. Cl.
*H04B 10/516* (2013.01)
(52) U.S. Cl.
CPC ................. *H04B 10/5167* (2013.01)
(58) Field of Classification Search
CPC .................. H04B 10/505; H04B 10/516
See application file for complete search history.

(56) References Cited

U.S. PATENT DOCUMENTS

| 5,509,033 A * | 4/1996 | Chen ................. H04L 27/2082 |
| | | 332/103 |
| 2011/0229150 A1* | 9/2011 | Nishihara .......... H04B 10/5162 |
| | | 398/195 |

FOREIGN PATENT DOCUMENTS

| EP | 1 128 580 A2 | 8/2001 |
| EP | 1 955 451 | 11/2005 |
| EP | 2 122 865 | 1/2007 |
| WO | 02 49299 A2 | 6/2002 |

(Continued)

OTHER PUBLICATIONS

Characteristics of Optical Duobinary Signals in Terabit/s Capacity, High-Spectral Efficiency WDM Systems by Takashi Ono et al.; Journal of Lightwave Technology, vol. 16, No. 5—May 1998.

(Continued)

*Primary Examiner* — Shi K Li
(74) *Attorney, Agent, or Firm* — Baker Botts, LLP

(57) ABSTRACT

A first signal is generated from an input signal by a first delay (70), and by low pass filtering (74). A second signal is generated from the input signal and from a second, longer delayed (72), version of the input signal, such that in response to a pulse on the input signal, the second signal has a sequence of two pulses, coinciding respectively with leading and trailing edges of a corresponding pulse on the first signal. If the signals are electrical, they can drive I and Q inputs of an IQ modulator (84, 86). If generated optically, they can be combined directly to produce the encoded optical output signal. By using such delays and filtering to produce these signals, a CAPS-3 encoded optical signal can be simulated, to obtain its chromatic dispersion tolerance advantages with less complex hardware and less power consumption.

29 Claims, 12 Drawing Sheets

(56) References Cited

FOREIGN PATENT DOCUMENTS

WO         2017 202464 A1    11/2017

OTHER PUBLICATIONS

Duobinary Modulation for Optical Systems by Had Shenker—Sep. 22, 2015.
Novel Optical Lines Codes Tolerant to Fiber Chromatic Disperson by Enrico Forestieri and Giancarlo Prati; Journal of Lightwave Technology, vol. 19, No. 11—Nov. 2011.
PCT International Search Report for International application No. PCT/EP2016/069085—dated May 15, 2017.
PCT Written Opinion of the International Searching Authority for International application No. PCT/EP2016/069085—dated May 15, 2017.

* cited by examiner

DELAYED AND LOW PASS FILTERED VERSION OF INPUT SIGNAL, IDEALISED

SUM OF INPUT SIGNAL AND SECOND DELAYED VERSION OF INPUT SIGNAL, IDEALISED

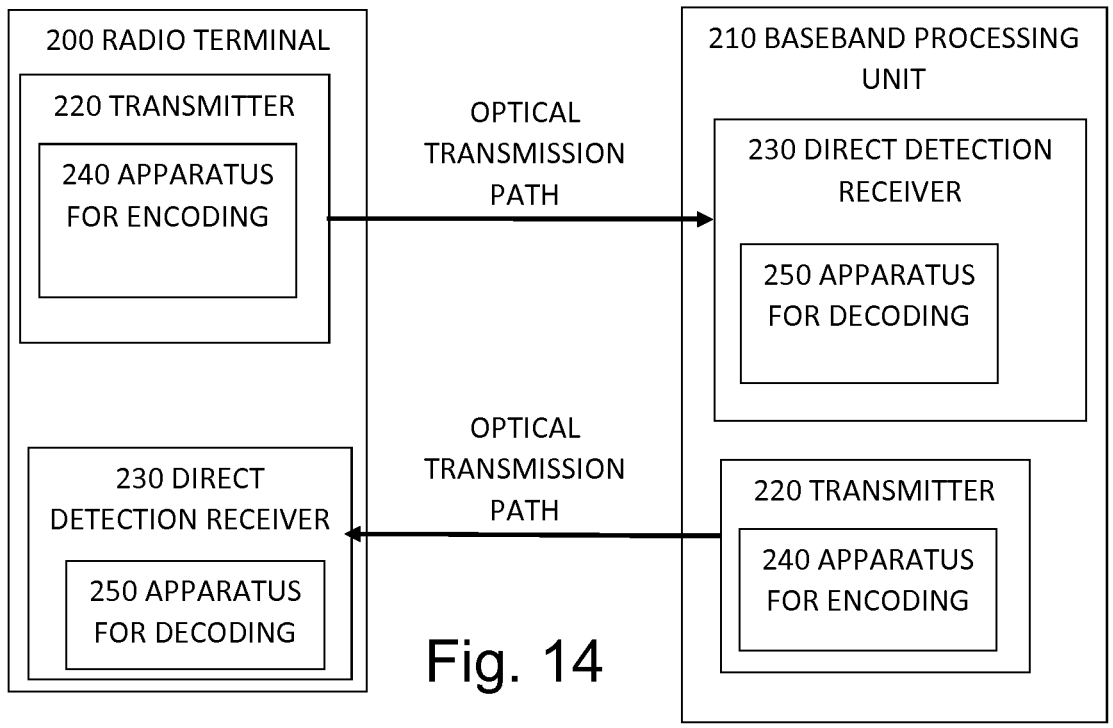
Fig. 14
Fig. 15
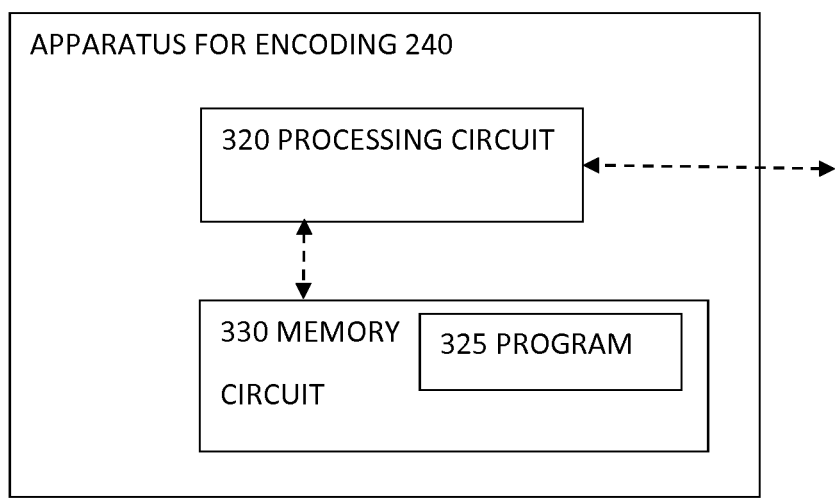

ENCODING FOR OPTICAL TRANSMISSION

PRIORITY

This nonprovisional application is a U.S. National Stage Filing under 35 U.S.C. § 371 of International Patent Application Serial No. PCT/EP2016/069085 filed Aug. 10, 2016 and entitled "Encoding For Optical Transmission" which is hereby incorporated by reference in its entirety.

TECHNICAL FIELD

The present disclosure relates generally to methods of encoding an input signal for optical transmission, to corresponding apparatus for encoding, to corresponding transmission systems, and to corresponding computer programs for carrying out such methods.

BACKGROUND

It is known to provide various types of encoding for optical transmission systems. A particular field of application of such optical transmission systems is related to the introduction of 5G mobile systems which need higher capacity (100+Gbit/s) in the fiber transport network, starting from its first aggregation stages. Using dedicated fibers for backhauling radio base stations or for fronthaul connections between remote radio unit (RRU) and baseband processing unit (BBU) in a split architecture, is not always a solution, due to cable leasing or installation costs. Moreover, operators may use the same fiber infrastructure for multiple purposes, not only for mobile front-, mid-, and back-haul (i.e. X-haul) but also for fixed access and aggregation, further increasing the capacity requirement per installed fiber.

The trend towards network centralization and cloudification requires the capability to convey traffic from several non co-located RRU sites to one hub node, which hosts centralized network and baseband processing functions. This adds to the capacity requirement a distance requirement. Typical distances to be supported are up to 20 km, according to the maximum fiber propagation delay that the most common fronthaul protocols can tolerate (e.g. 100 µs, corresponding to 5 µs/km).

The capability to comply with any kind of network topology (bus, ring, tree, mesh) is also important to ensure the maximum deployment flexibility of future X-haul networks, enabling them to meet scenarios that can vary over a wide range, depending on operator and country.

DWDM networks can satisfy all the previous requirements. Coherent optical transceivers for transmission in Dense Wavelength Division Multiplexed (DWDM) optical transmission systems are known and can meet the distance requirement. However, the cost of coherent optical transceivers makes them less suitable for cost-sensitive network segments such as access and aggregation. New access technologies are increasing the traffic levels in access and aggregation networks segments, requiring higher optical channel capacities from 25 to 100 Gbit/s. There is a need for more cost-effective high speed optical transceivers.

A lower cost alternative to a coherent optical interface is a direct detection optical interface. Direct detection is widely used to provide 10 Gbit/s On Off Keying (OOK) optical channels. This technology is cheaper but suffers from two main drawbacks: (i) reduced sensitivity and noise tolerance; (ii) poor tolerance to chromatic dispersion. The first issue can be solved by using optical amplification, or by splitting the optical channels into two sub-channels at two different wavelengths, or by splitting the optical channels into two orthogonal linear polarization states. The second issue requires either the use of devices to compensate for the chromatic dispersion (e.g. Dispersion Compensating Fiber (DCF) or Fiber Bragg Grating (FBG)), or the use of a spectrally efficient modulation technique. For whatever modulation format, the narrower the spectrum, the lower the chromatic dispersion penalty. A narrow spectrum can be achieved by use of a multi-level modulation format or line coding. However, when using multi-level modulation formats, the achievable transmission distance is not always improved as the increased number of levels counterbalances the improved spectral efficiency, due to the lower tolerance of multi-level formats to the noise.

One typical solution provided by optical modules suppliers is the upgrade to DWDM of PAM-4 or DMT grey interfaces, (i.e. interfaces with no stabilized laser working in the 850 nm or 1310 nm wavelength regions) now used for interconnection purposes, which requires the minimal effort of replacing an uncooled laser with a stabilized one in the 1550 nm wavelength region. However, this solution is largely sub-optimal for system vendors or operators, for the reasons explained below.

DWDM uses the C band, centered on 1550 nm, rather than the O band, centered on 1310 nm. This has the big advantages of exploiting the EDFA amplification bandwidth and lower fiber attenuation values (attenuation coefficient is about 0.2 dB/km in C band and 0.3 dB/km in O band). However, moving from 1310 to 1550 nm, the fiber chromatic dispersion (roughly 1 and 17 µs/nm/km in O and C band, respectively), introduces a sensitivity penalty. At 10 Gbit/s the tolerated chromatic dispersion with 2 dB penalty is 800 µs/nm (about 47 km of fiber). Since the penalty scales with the square of the bit-rate, at 100 Gbit/s we obtain 8 µs/m for the same penalty value, which corresponds to about 500 m of fiber. Implementing DWDM systems in O band would not solve the problem because in absence of chromatic dispersion the four wave mixing (FWM, a fiber non-linear effect) would cause unacceptable inter-channel cross talk also at low channel power.

To deal with such chromatic dispersion in C band, non-coherent channels (e.g. based on 10 Gbit/s pluggable modules) rely on external dispersion compensators, which are modules that are placed in line to introduce a dispersion value equal and opposite to the fiber one. Coherent interfaces exploit instead electrical equalization at the receiver at the same purpose. In the former case, we have external devices that introduce additional cost and losses. In the latter one, energy consumption (tens of Watts) is the main drawback. Particularly for cost sensitive applications such as X-haul networks it would be desirable to avoid both of these issues.

Two known types of modulation formats at the transmitter side suitable for such front-haul interfaces are DQPSK and CAPS-3, which have benefits of good tolerance to chromatic dispersion. However, CAPS-3 has a better sensitivity and chromatic dispersion tolerance and significantly outperforms DQPSK for longer distances over about 15 km. For CAPS-3 the drawbacks are the cost and complexity of 8-state encoding circuitry, and the power consumption of the required high speed DAC. Accordingly, there is a need for a simplified encoding for optical transmission.

SUMMARY

An aspect of this disclosure provides a method of encoding for optical transmission of an input signal, comprising generating a first signal based on the input signal by providing a first delay, and by low pass filtering of the input signal. A second signal is generated based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal. An encoded optical output signal is generated based on the first signal and the second signal.

Examples of apparatus having these features can have reduced complexity and cost for a given level of performance. Notably the particular arrangement of delays and filtering can enable important features of CAPS-3 encoded optical signal to be simulated so that the chromatic dispersion tolerance advantage of such known CAPS-3 coding can be achieved without needing the costly hardware such as a DAC and 8-state encoding circuitry of a known CAPS-3 encoder. Compared to other known coders of comparable simplicity and hardware cost, the chromatic dispersion tolerance can be notably higher which can enable longer reach without costly dispersion compensators, while maintaining the benefit of not needing expensive coherent receivers. It is based on an insight that the I and Q waveforms for the known CAPS-3 can be approximated or simulated by suitably delayed and filtered signals, and an insight that this means that simpler and less costly hardware can be used.

Any additional features can be added optionally. One such optional feature is the first signal and the second signal comprising first and second electrical signals and the step of generating based on the first signal and the second signal comprising modulating an I input of an IQ modulator according to the first electrical signal and modulating a Q input of the IQ modulator according to the second electrical signal, to provide the encoded optical output signal for transmission.

Another option is that the first and second signals have waveforms simulating I and Q waveforms of a CAPS-3 encoder.

Optionally the step of generating the second signal comprises adding the input signal to the second delayed version of the input signal.

Optionally for the steps of generating the first and second signals, the second delay is twice the duration of the first delay.

Optionally, for the steps of generating the first and second signals, the first delay is one symbol time of the input signal.

Optionally there is a step of altering a relative amplitude of the first and second signals before the step of generating the encoded optical output signal based on the first signal and the second signal.

Optionally the generating of the first and second signals is such that in response to multiple pulses on the input signal, the corresponding pulses of the first signal are alternately positive-going and negative-going, and the corresponding two pulses of the second signal go in the same direction as those of the first signal.

Optionally the low pass filtering has a pass band up to ¼T where T is a symbol time of the input signal.

Optionally the step of generating the second signal comprises using a low pass filtered version of the input signal.

Optionally the low pass filtering has a pass band up to 1/T where T is a symbol time of the input signal.

Optionally the first and second signals comprise first and second optical signals, and there is a step of using a modulator to generate an optical input signal from the input signal. In this case the step of generating the first signal comprises using a first optical delay for delaying the optical input signal, and the step of generating the second signal comprises generating the second optical signal based on the optical input signal and based on a second delayed version having a second optical delay longer than the first optical delay. The second optical signal is generated such that in response to a pulse on the input signal, the second optical signal has a sequence of two pulses, the two pulses coinciding respectively with leading and trailing edges of a corresponding pulse on the first optical signal. The step of generating the encoded optical output signal is based on optically combining the first optical signal and the second optical signal.

Optionally there is a step of using nested interferometers to generate the first and second optical signals, and to combine the first and second signals.

Optionally the step of altering a relative amplitude of the first and second signals comprises optically changing a relative amplitude of the first optical signal and the second optical signal.

Optionally the optical transmission is for front-haul between a radio terminal and a baseband processing unit.

Optionally there are subsequent steps of transmitting the encoded optical output signal to a receiver and using direct detection at the receiver to receive the optical transmission.

Another aspect of this disclosure provides apparatus for encoding an input signal for optical transmission, the apparatus comprising a first component configured to generate a first signal based on the input signal by providing a first delay, and by low pass filtering the input signal, and a second component configured to generate a second signal. The second signal is generated based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal. There is an optical output component configured to generate an encoded optical output signal based on the first signal and the second signal.

Optionally the first component and the second component comprise first and second electrical circuitry, the first and second signals comprise first and second electrical signals, and the optical output component comprises an IQ modulator configured such that an I input of the IQ modulator is modulated according to the first electrical signal and a Q input of the IQ modulator is modulated according to the second electrical signal, to provide the encoded optical output signal for transmission.

Optionally the first and second components are configured to generate first and second signals having waveforms simulating I and Q waveforms respectively of a CAPS-3 encoder.

Optionally the second component is also configured to generate the second signal by adding the input signal to the second delayed version of the input signal.

Optionally the second component is configured to generate the second delayed version based on the second delay being twice the duration of the first delay.

Optionally the first component is configured to generate the first signal based on the first delay being one symbol time of the input signal.

Optionally there is a third component configured to alter a relative amplitude of the first and second signals before they are used to generate the encoded optical output signal.

Optionally the first and second components are configured to generate the first and second signals such that in response to multiple pulses on the input signal, the corresponding pulses of the first signal are alternately positive-going and negative-going, and the corresponding two pulses of the second signal go in the same direction as those of the first signal.

Optionally the low pass filtering has a pass band up to ¼T where T is a symbol time of the input signal.

Optionally the second component is configured to use a low pass filtered version of the input signal for generating the second signal.

Optionally the low pass filtered version of the input signal for generating the second signal having a pass band up to 1/T where T is a symbol time of the input signal.

Optionally the first and second components comprise first and second optical components and the first and second signals comprise first and second optical signals, the apparatus also comprising a modulator for generating an optical input signal based on the input signal, and the first optical component being configured to generate the first optical signal having a first optical delay based on the optical input signal. In this case the second optical component is configured to generate the second optical signal based on the optical input signal and based on a second delayed version having a second optical delay, longer than the first optical delay, such that in response to a pulse on the optical input signal, the second optical signal has a sequence of two pulses, the two pulses coinciding respectively with leading and trailing edges of a corresponding pulse on the first optical signal. The optical output component is configured to generate the encoded optical output signal by optically combining the first optical signal and the second optical signal.

Optionally the first and second optical components comprise interferometers configured as nested interferometers to generate the first and second optical signals, and the optical output component comprises a part of the nested interferometers configured to combine the first and second signals.

Optionally the third component comprises a third optical component configured to change a relative amplitude of the first optical signal and the second optical signal before they are optically combined.

Another aspect of this disclosure provides an optical transmission system comprising a transmitter and a receiver, the transmitter having the apparatus of described above.

Optionally the optical transmission system is configured for front-haul between a radio terminal and a baseband processing unit.

Optionally the receiver is configured to use direct detection to receive the optical transmission.

Another aspect of this disclosure provides a computer program for encoding a signal for optical transmission, the computer program comprising computer code which, when run on processing circuitry of an encoding apparatus, causes the encoding apparatus to generate a first signal based on the input signal by providing a first delay, and by low pass filtering of the input signal. It also causes the encoding apparatus to generate a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and to cause the encoding apparatus to generate an encoded optical output signal based on the first signal and the second signal.

Another aspect of this disclosure provides a computer program product comprising a computer program as set out above, and a computer readable storage medium on which the computer program is stored.

Another aspect of this disclosure provides an apparatus for encoding an input signal for optical transmission, the apparatus comprising processing circuitry; the processing circuitry being configured to cause the apparatus to generate a first signal based on the input signal by providing a first delay, and by low pass filtering of the input signal. The processing circuitry being further configured to generate a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and generate an encoded optical output signal based on the first signal and the second signal.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

Embodiments of the invention will now be described, by way of example, with reference to the appended drawings, in which:

FIG. 14 shows a schematic view of an example of an optical transmission system for front-haul between a radio terminal and a baseband processing unit, and FIG. 15 shows an example of apparatus for encoding implemented with a processing circuit, a memory circuit and a stored program.

DETAILED DESCRIPTION

Figure 1:
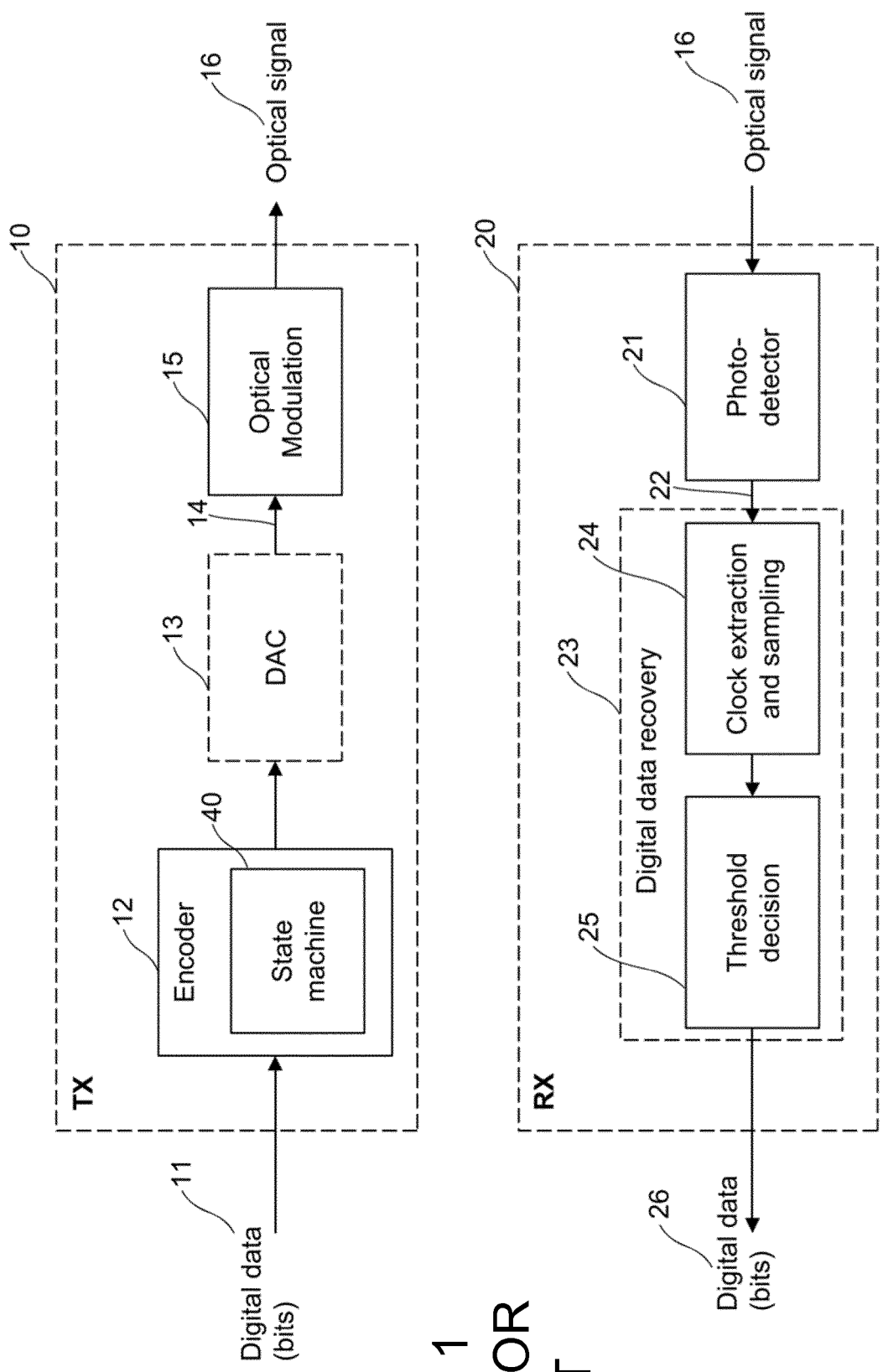
FIG. 1 shows a schematic view of an example of a conventional optical transmission system.

The present invention will be described with respect to particular embodiments and with reference to certain drawings but the scope of the invention is not limited thereto and modifications and other embodiments are intended to be included within the scope of the disclosure. The drawings described are only schematic and are non-limiting. In the drawings, the size of some of the elements may be exaggerated and not drawn to scale for illustrative purposes.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

The steps of the methods described herein may be carried out in any suitable order, or simultaneously where appropriate.

References to computer programs or software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

| Abbreviations: | |
|---|---|
| ADC | Analog to Digital Converter |
| ASIC | Application Specific Integrated Circuit |
| BBU | Base Band Unit |
| CAPS | Combined Amplitude Phase Shift |
| CW | Continuous Wave |
| DAC | Digital to Analog Converter |
| DCF | Dispersion Compensating Fiber |
| DMT | Discrete Multi Tone |
| DQPSK | Differential Quadrature Phase Shift Keying |
| DWDM | Dense Wavelength Division Multiplexing |
| EDFA | Erbium Doped Fiber Amplifier |
| FBG | Fiber Bragg Grating |
| FEC | Forward Error Correction |
| FWM | Four Wave Mixing |
| IQ | In phase in Quadrature |
| MZM | Mach Zehnder Modulator |
| OADM | Optical Add Drop Multiplexer |
| OOK | On Off Keying |
| OSNR | Optical Signal to Noise Ratio |
| PAM | Pulse Amplitude Modulation |
| RRU | Remote Radio Unit |
| SFP | Small Form Pluggable |

By way of introduction to the embodiments, some issues with conventional designs will be explained.

FIG. 1. Conventional Optical Transmission System

FIG. 1 shows an example of a conventional optical transmission system having an optical transmitter 10 and an optical receiver 20. The optical transmitter 10 has an input to receive digital data. The optical transmitter 10 comprises an encoder 12 (also referred to as a line encoding apparatus) which maps binary digital data to line symbols. The encoder 12 can comprise, or be considered to operate as, a state machine 40. The encoder 12 may directly output analog signals at amplitudes corresponding to the set of line symbols. The encoder 12 is for encoding a signal for transmission, e.g. optical transmission. Alternatively, the encoder 12 may indicate, for each operation of the state machine, a line symbol required. For example, each of the line symbols can correspond to a digital code which is used internally by the transmitter. A digital-to-analog converter (DAC) 13 outputs an analog value, corresponding to the digital code of the required line symbol. The output of the encoder, or DAC 13 (if used), is a multi-level analog signal 14. Optionally, a low pass filter may be included in the transmitter 10 to low pass filter the signal. Alternatively, a low-pass filtering effect is provided by the limited bandwidth of the modulator. The analog signal is used to modulate an optical carrier in an optical modulation stage 15 (e.g. Mach Zehnder Modulator) and output a modulated optical signal 16.

The receiver 20 has an input to receive the modulated optical signal 16. The receiver 20 comprises a photodetection stage 21 which is configured to receive the optical signal and to output an electrical signal 22. As described above, the photodetection stage 21 outputs an electrical signal which is proportional to power of the received optical signal. The photodetection stage may include an electrical amplifier (e.g. a transimpedance amplifier). The electrical signal can represent a set of possible received symbols. A digital data recovery stage 23 is configured to recover digital data from the received symbols. The digital data recovery stage 23 comprises a threshold decision unit 25 which is configured to compare the electrical signal with one or several amplitude thresholds. The digital data recovery stage 23 can also comprise a clock extraction and sampling unit 24 which is configured to extract a clock signal from the detected electrical signal and to sample the detected electrical signal at points in time determined by the extracted clock. The threshold decision unit 25 is configured to determine that the digital data is a first binary value when the electrical signal 22 is less than an amplitude threshold TH or a second binary value when above the amplitude threshold TH for example. The determined symbol value is output as digital data 26, corresponding to the transmitted digital data 11. If CAPS-3 type encoding for example, is used at the transmitter, this means the state machine 40 is relatively complex and expensive to implement in sufficiently fast logic circuitry. The DAC 13 used has unavoidably high power consumption because of the high frequency of operation, and therefore is costly.

Figure 2:
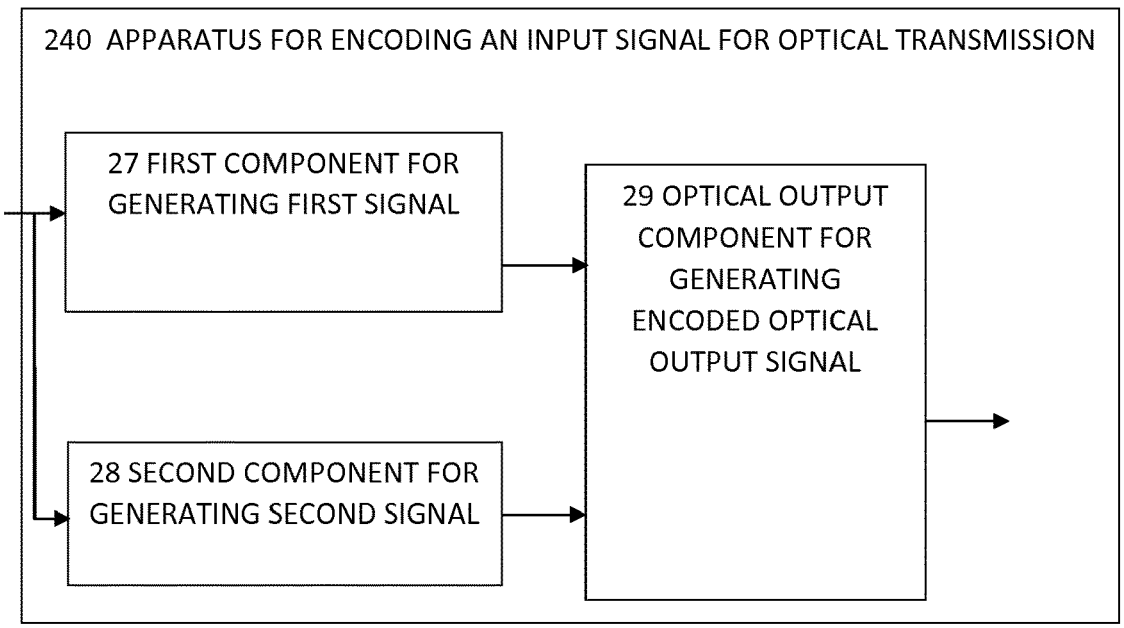
FIG. 2 shows a schematic view of apparatus according to an embodiment.

FIG. 2. Apparatus According to an Embodiment

FIG. 2 shows a schematic view of an embodiment showing apparatus 240 for encoding an input signal for optical transmission. The apparatus can replace parts 12, 13 and 14 in the transmitter of FIG. 1 and enable considerable simplification and thus cost reduction while maintaining the performance needed for the applications described above. A first component 27 is shown for generating a first signal, and can be implemented in various ways as will be described in more detail with reference to other figures. A second component 28 is shown for generating a second signal, and again can be implemented in various ways as will be described in more detail with reference to other figures. An optical output component 29 is shown as being coupled to receive the first and second signals and is for generating an encoded optical output signal for optical transmission, based on the first and second signals.

Examples of how these components can operate will now be described with reference to FIGS. 3 to 13 at least.

Figure 3:
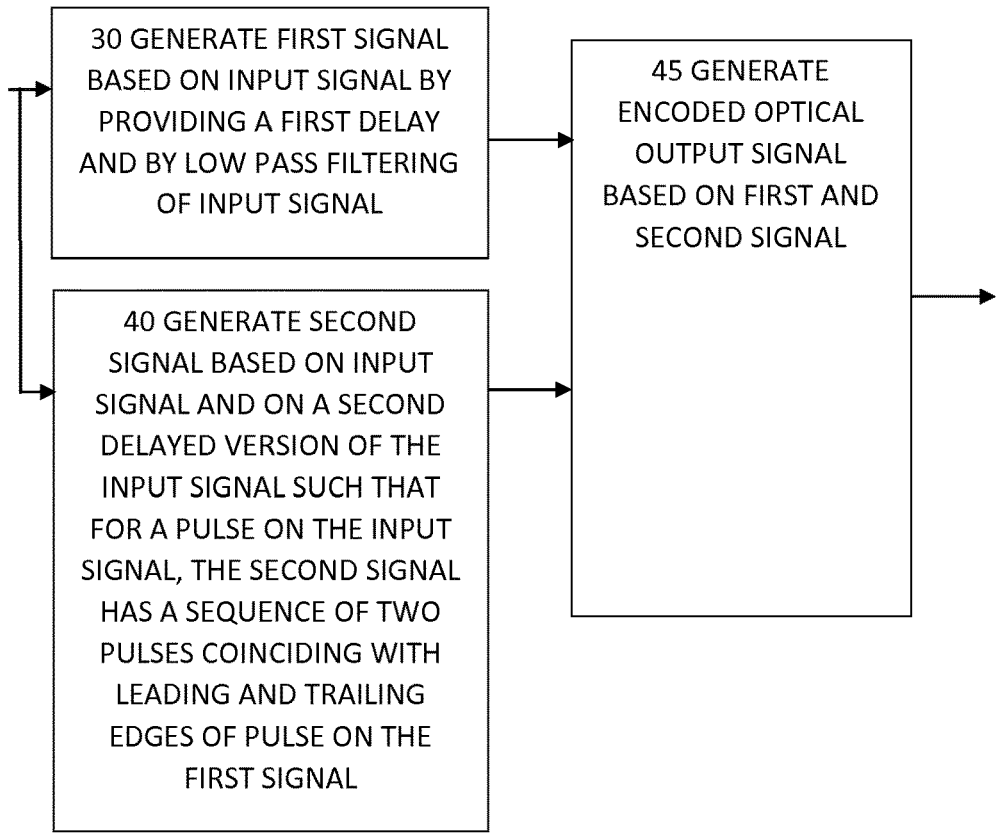
FIG. 3 shows steps according to a method according to an embodiment.
Figure 4:
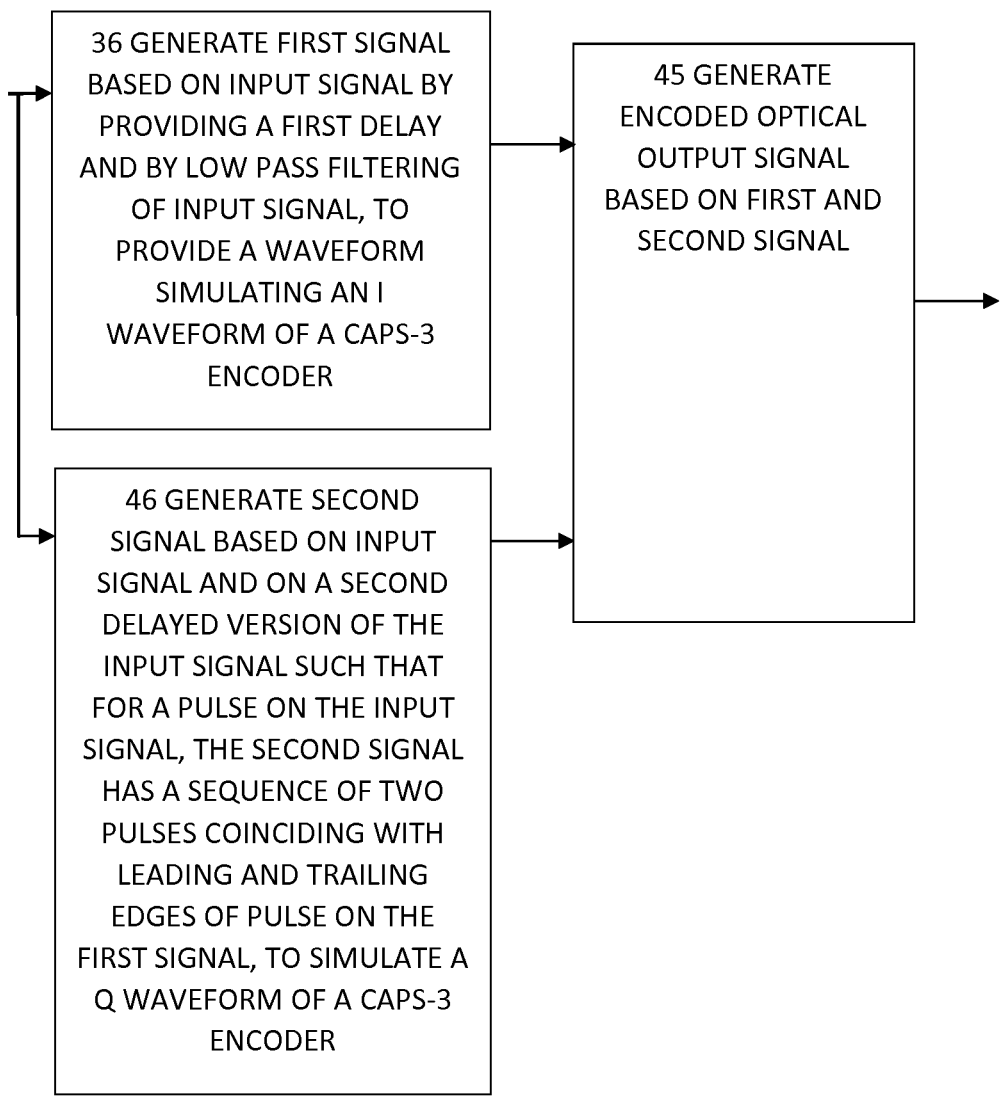
FIG. 4 shows steps according to another method according to an embodiment.

FIGS. 3 and 4. Operational Steps According to an Embodiment

FIG. 3 shows a step 30 of generating the first signal based on the input signal by providing a first delay and by low pass filtering of the input signal. This may be carried out by the first component shown in FIG. 2. Step 40 shows a step of generating the second signal based on the input signal and on a second delayed version of the input signal such that in response to a pulse on the input signal, the second signal has a sequence of two pulses (e.g. a first pulse and a second pulse) coinciding respectively with the leading and trailing edges of a corresponding pulse on the first signal. Step 45 shows generating the encoded optical output signal based on the first and second signal.

This simplified scheme is based on the observation that CAPS-3 coding can be effectively simulated by generating two low pass filtered signals, having specified bandwidths and amplitudes, for driving the I and Q branches of an IQ modulator. Notably the two signals can be generated by delays and filters, as set out above, without needing the complex and power consuming circuitry of the state machine and DAC of the conventional arrangement. Hence a significant simplification and thus cost reduction can be achieved.

This is a particularly simple and thus less costly way of implementing encoding for transmission. Notably the particular arrangement of delays and filtering can enable important features of a CAPS-3 encoded optical signal to be simulated so that the chromatic dispersion tolerance advantage can be achieved, without needing the complexity and high power consumption of hardware such as the DAC and 8-state encoding circuitry. Compared to other known coders of comparable simplicity and hardware cost, the chromatic dispersion tolerance can be notably higher which can enable longer reach without costly optical amplification and dispersion compensators, while maintaining the benefit of not needing expensive coherent receivers since it can be used with direct detection, avoiding the cost of an additional laser used as the local oscillator at the receiver. In some examples it avoids the costs of external dispersion compensation for distances of up to about 18 to 20 km. In some examples the resulting receiver sensitivity and OSNR tolerance can be 4 dB better than a conventional PAM-4 encoding scheme. And the energy efficiency is good, by avoiding the need for a DAC at the transmitter.

FIG. 4 shows similar steps to those of FIG. 3, but limited explicitly to an example in which the first signal is generated at step 36 to have a waveform simulating an I (in-phase) waveform of a CAPS-3 encoder and the second signal is generated at step 46 to have a waveform simulating a Q (quadrature) waveform of a CAPS-3 encoder. As in FIG. 3 there is a step 45 of generating the encoded optical output signal based on the first and second signal.

Figure 5:
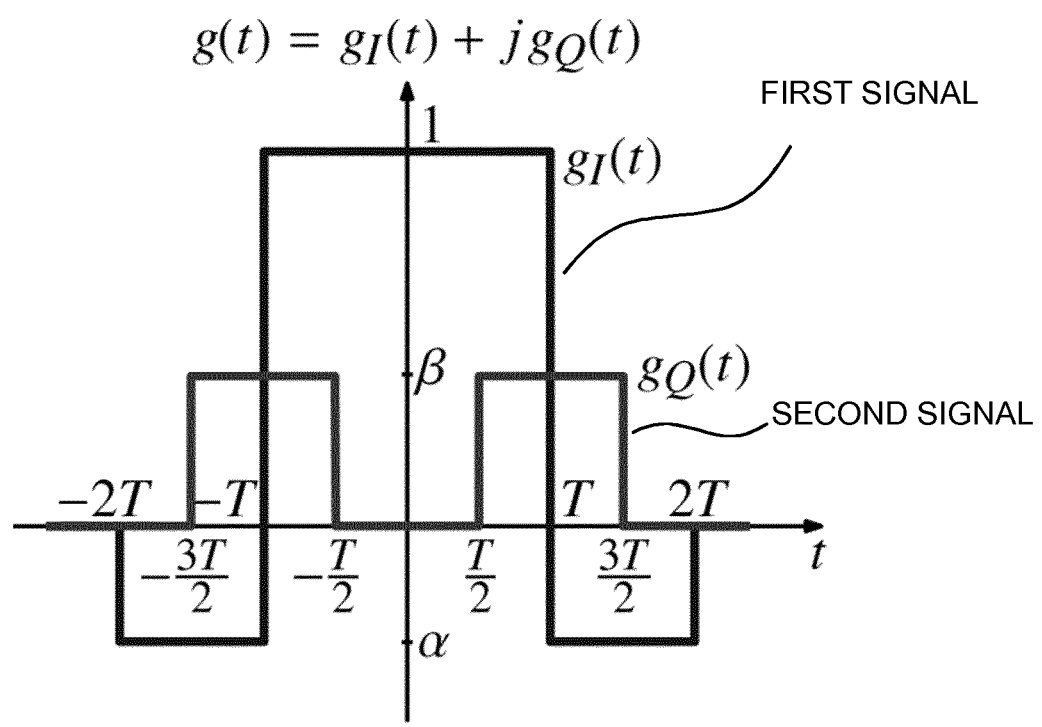
FIG. 5 shows a timechart of waveforms of first and second signals.

FIG. 5. Timechart Showing Waveforms of First and Second Signals

FIG. 5 shows a chart having time along the x-axis and amplitude on the y-axis, and shows an idealized example of the I and Q waveforms superimposed, for a CAPS-3 type encoding, which is to be simulated by the first and second signals respectively. It is idealized in that it shows square shaped pulses whereas a more practical example would be more rounded as a result of the low pass filtering, and circuit characteristics. Other examples are possible. The chart shows a response to a pulse of duration T on the input signal. The first signal is shown as $g_I(t)$, and the second signal as $g_Q(t)$. The output signal based on these first and second signals would be:

$$g(t)=g_I(t)+jg_Q(t)$$

As shown, the first signal has a waveform having main upward pulse of duration 2T, with optional small downward negative pulses before and after, of duration T, which are present in the theory of the CAPS-3 encoding scheme but which can be largely neglected in practice. This shape can be achieved approximately by low pass filtering. The first signal is delayed slightly to enable the leading upward transition to coincide with the first of the two pulses forming the second signal. The second of the two pulses in the second signal can be formed by the second delayed version of the input signal, which should be delayed longer than the first delay, to enable it to coincide with the trailing downward edge of the first signal. The resulting waveforms shown, effectively pre-compensate for chromatic dispersion in the transmission path, so that the received pulse after suffering chromatic dispersion is as close as possible to the shape of the input pulse.

The relative amplitudes (shown as 1 and β) of the first and second signal, and the amount of undershoot (shown as α) which will depend on the characteristics of the low pass filtering, can be tuned to optimize the transmission according to the actual chromatic dispersion and other characteristics of the transmission path.

CAPS-3 Coding Theory

CAPS-N is a family of modulation formats [Enrico Forestieri and Giancarlo Prati: Novel Optical Line Codes Tolerant to Fiber Chromatic Dispersion, IEEE JLT VOL. 19, NO. 11, NOVEMBER 2001] where the source bits are encoded to narrow the transmitted spectrum so that the signal is more robust to the chromatic dispersion introduced by the fiber.

The order-N code has $2^N$ states $\Sigma_i$, i=1, 2, . . . , N.

At time kT (state Σm), the information bit $u_k$ forces a transition to state $\Sigma_q$ and the transmission of the waveform $s_i(t)$, where q and i are given by:

$$a = m - 1 \bmod 2$$
$$b = a + u_k \bmod 2$$
$$r = 2(m-1) + b$$
$$q = (r \bmod N) + 1$$
$$i = \begin{cases} r+1 & \text{if } r < N \\ r - 2N & \text{otherwise} \end{cases}$$

and the signals si(t), i=±1, . . . , ±N, are such that s-i(t)=-si(t).

Letting $$b_{ik} = \left\lfloor \frac{i-1}{2} \right\rfloor \bmod 2, \quad \begin{matrix} i = 1, 2, \ldots, N \\ k = 0, 1, \ldots, n \end{matrix}$$

the signals are given by $$s_i(t) = \begin{cases} \sum_{k=0}^{n} (b_{i,k} - 0.5) g\left(t + \left(k - \frac{n+1}{2}\right)T\right), & 0 \le t \le T \\ 0 & \text{otherwise} \end{cases}$$

where g(t) is a complex pulse (i.e. a pulse requiring an IQ modulator) of length D=(n+1)T.

For CAPS-3, which is the relevant case here, $$s_i(t) = \begin{cases} \sum_{k=0}^{3} (b_{i,k} - 0.5)g(t + (k-2)T), & 0 \le t \le T \\ 0 & \text{otherwise} \end{cases}$$

$$i = 1, 2, \ldots, 8$$

Where $$b_{i,k} = \left\lfloor \frac{i-1}{2^k} \right\rfloor \bmod 2$$

This gives the waveforms shown in FIG. 5.

FIGS. 6-11, Electrical Signal Embodiments

Figure 6:
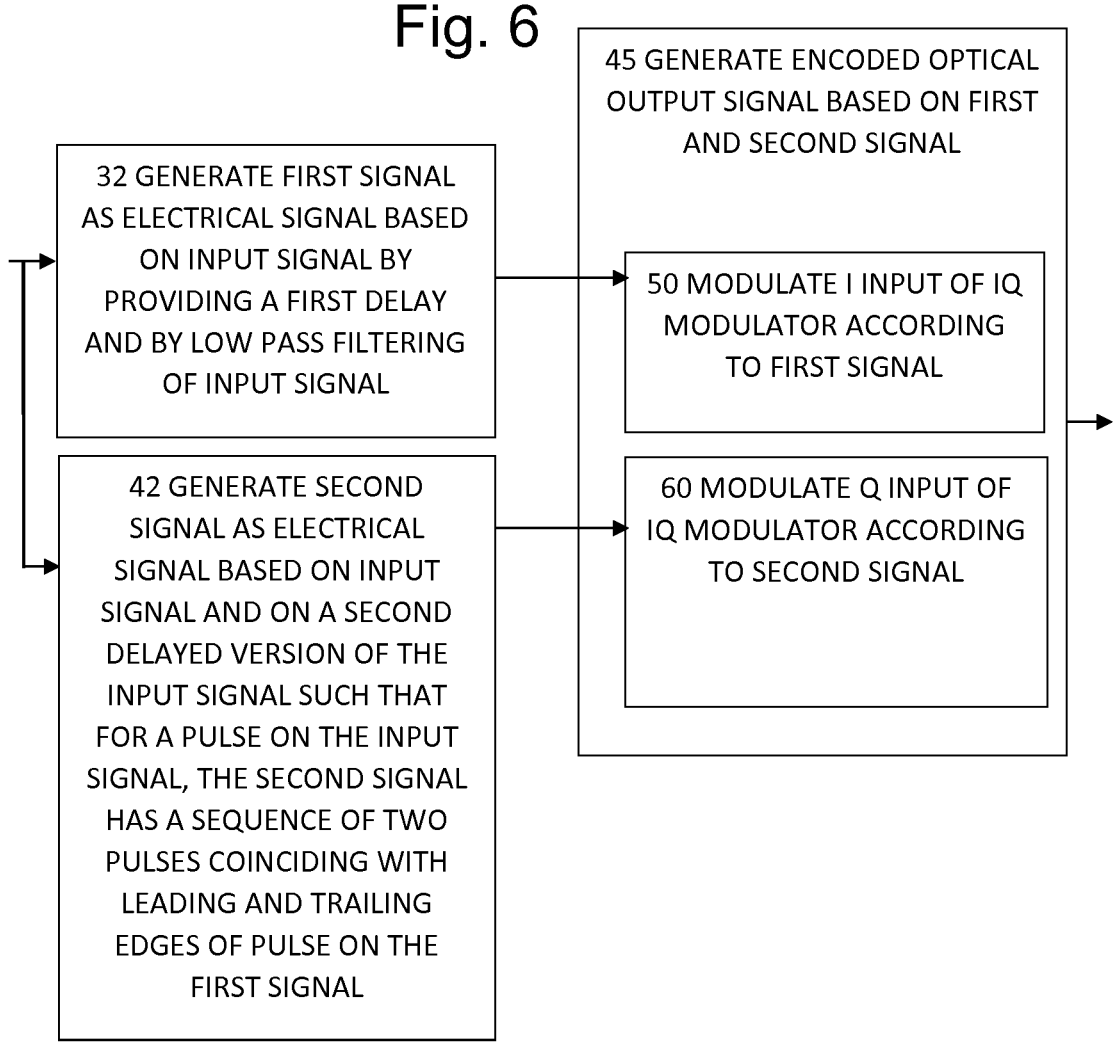
FIG. 6 shows a method according to an embodiment having electrical domain signals.

FIG. 6 shows a shows similar steps to those of FIG. 3, but limited explicitly to an example in which the first and second signals are electrical signals, and these two signals are used to modulate the I and Q inputs of an IQ modulator to generate the encoded optical output. Hence there is shown a step 32 for generating the first signal as an electrical signal based on the input signal by providing a first delay and by low pass filtering in the electrical domain. A step 42 is provided for generating the second signal as an electrical signal based on the input signal and on a second delayed version of the input signal in the electrical domain. As before, the second signal is generated such that in response to a pulse on the input signal, the second signal has a sequence of two pulses (first and second pulses) coinciding with the leading and trailing edges of the corresponding pulse on the first signal.

The step of generating the encoded output signal has step 50 of modulating the I input of an IQ modulator according to the first signal, and a step 60 of modulating the Q input of the IQ modulator according to the second signal.

Figure 7:
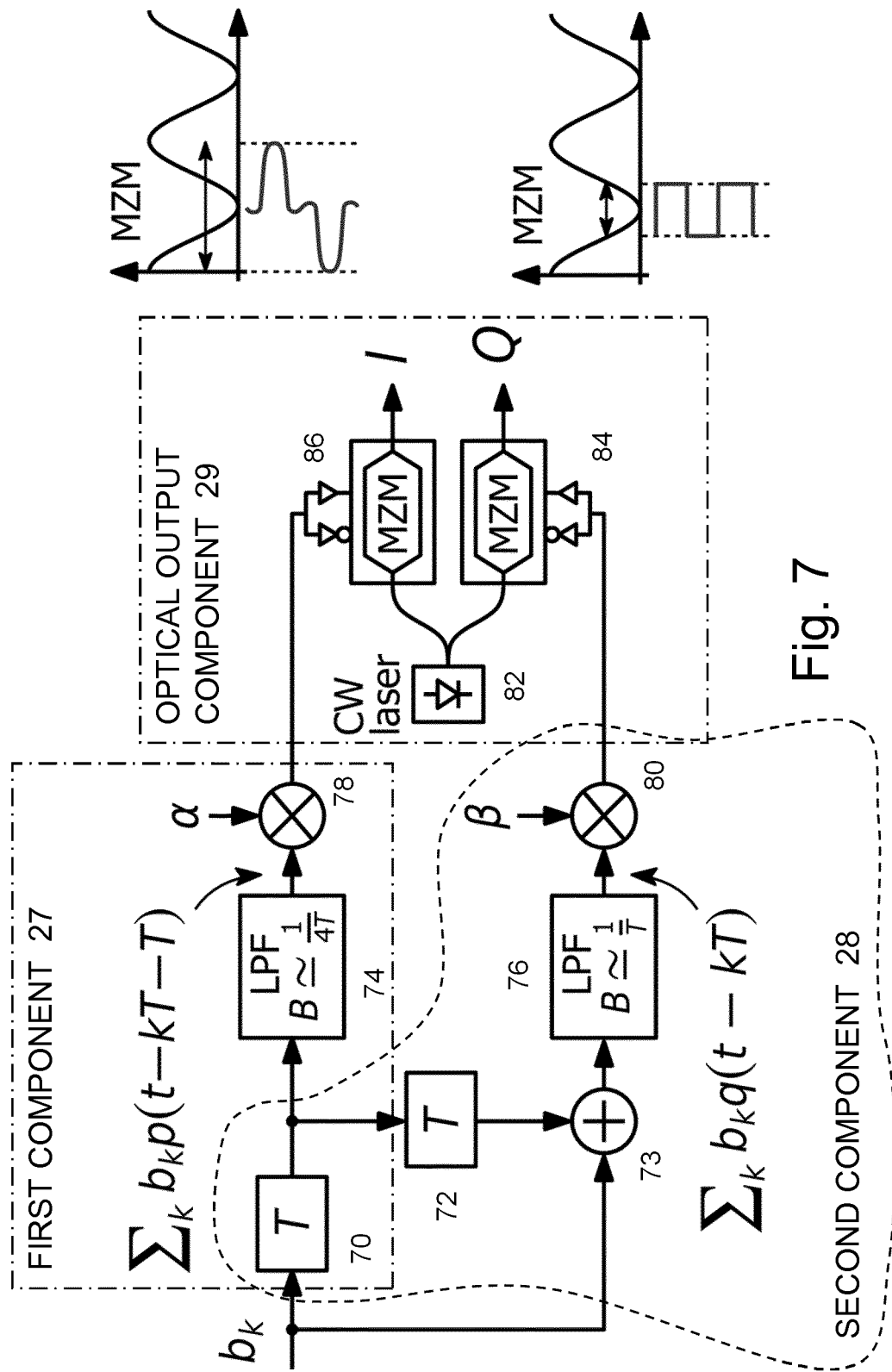
FIG. 7 shows a schematic view of apparatus according to an embodiment having electrical domain signals.

FIG. 7 shows a schematic view of apparatus according to an embodiment having components for generating the first and second signals in the electrical domain as described above for FIG. 6. The first component 27 receives input signal $b_k$ and has a delay element 70 for providing a first delay of time T. This feeds a low pass filter 74 with a cut off frequency of approximately ¼T. (In principle the order of these parts can be changed, and in one example a common low pass filter may be applied to the input signal before it is divided for generating the first and second signals.) An amplifier 78 or attenuator is provided to alter a relative amplitude of the first and second signals. The resulting first signal is coupled to drive the I input 86 of the IQ modulator which forms the optical output component 29.

FIG. 7 also shows how the second component in this example has delays of 2T formed by sharing the first delay element 70 and providing in series, a further delay element 72 to give a total delay of 2T. This gives a second delayed version having a longer delay than that of the first signal. An adder 73 is provided for adding the original input signal to the second delayed version output by the delay 72. This provides a second signal having a sequence of two pulses in response to a pulse on the input signal. An optional low pass filter 76 having for example a cut off at frequency 1/T is provided here or at some other point in the processing chain. An amplifier 80 (or attenuator) is provided for altering the relative amplitude, at this point or elsewhere, and then the second signal is fed to drive the Q input 84 of the IQ modulator. The IQ modulator has an optical source, shown here as a CW laser 82, and has separate MZMs for generating I and Q optical outputs in this case. The optical I and Q outputs of the modulator would be combined optically (not shown) in a conventional manner, before transmission along the optical path to the receiver. The figure also shows an example of waveforms showing how the light output of each MZM varies with each of the I and Q drive signals. The light output is at a minimum when the driving signal is in the middle of its range.

This figure shows an example where for the steps of generating the first and second signals, the second delay is twice the duration of the first delay. This can help to optimise the delay for recreating a CAPS-3 type of encoding for a transmission path without differences between I and Q delays, but other delay values can be used if useful to compensate for distortions such as differences between I and Q path delays for example. It also shows an example in which the first delay is one symbol time of the input signal. This can help to optimise synchronisation of the I and Q inputs for simulating a CAPS-3 type of encoding of symbols, but again other delay values can be used for example for the purpose of compensating for differences in propagation delays between I and Q paths at the transmitter or for compensation of other distortions.

This is also an example of an embodiment in which there is a third component in the form of an amplifier 78, 80 for altering a relative amplitude of the first and second signals before the step of generating the encoded optical output signal based on the first signal and the second signal. This relative amplitude can be set or made adjustable according to a fiber distance and/or a fiber dispersion characteristic to enable optimisation of the dispersion tolerance of the encoding for example.

The figure also shows an example of the low pass filtering comprising filtering corresponding to duobinary encoding of the input signal in the sense that alternate pulses are made positive and negative-going. A digital or analog low pass filtering step is one way to generate such a duobinary encoded signal, and this can be combined with the low pass filtering to help to optimise narrowing of the bandwidth, to further approximate to the CAPS-3 type waveform to improve the tolerance of chromatic dispersion.

The example here shows low pass filtering having a pass band up to ¼T where T is a symbol time of the input signal. This can help optimise a narrowing of the bandwidth and help approximate to a waveform of a CAPS-3 encoder, but a range of pass bands can be used, such as up to ½T or 1/T for example.

In the example here, LPF 76 shows generating the second signal using a low pass filtered version of the input signal and this can help to optimise narrowing of the bandwidth, to improve the tolerance of chromatic dispersion. In principle this LPF can be located earlier in the signal path or even be applied to the input signal before it is split for generating the first and second signals. As shown this low pass filtering can have a pass band up to 1/T where T is a symbol time of the input signal. This can further help optimise an approximation to a waveform of a CAPS-3 encoder. Again a range of pass bands can be used.

Figures 8, 9:
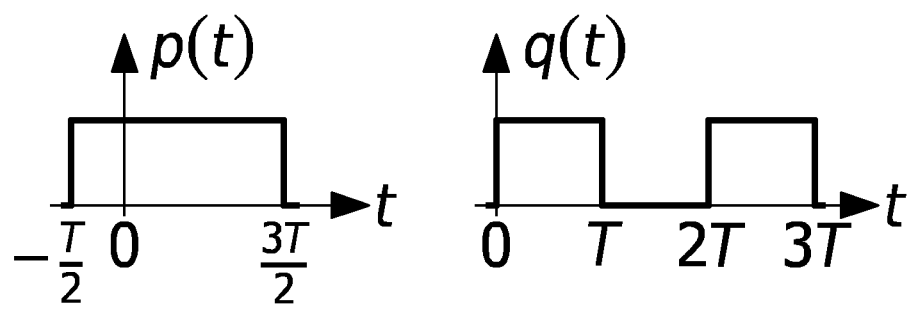
FIG. 8 shows a time chart of a waveform of a first signal.
FIG. 9 shows a time chart of a waveform of a second signal.

FIGS. 8 and 9 show other examples of first and second signals for driving the I and Q inputs. In this case there is no relative amplitude difference. The first signal in FIG. 8 is a pulse of duration 2T in response to an input pulse of length T. The second signal in FIG. 9 shows a sequence of two pulses of length T in response to a pulse of length T on the input signal. They are shown on separate time scales, so no attempt has been made to illustrate their relative timing so that the leading and trailing edges of the pulse on the first signal coincide with the two pulses respectively on the second signal.

Figure 10:
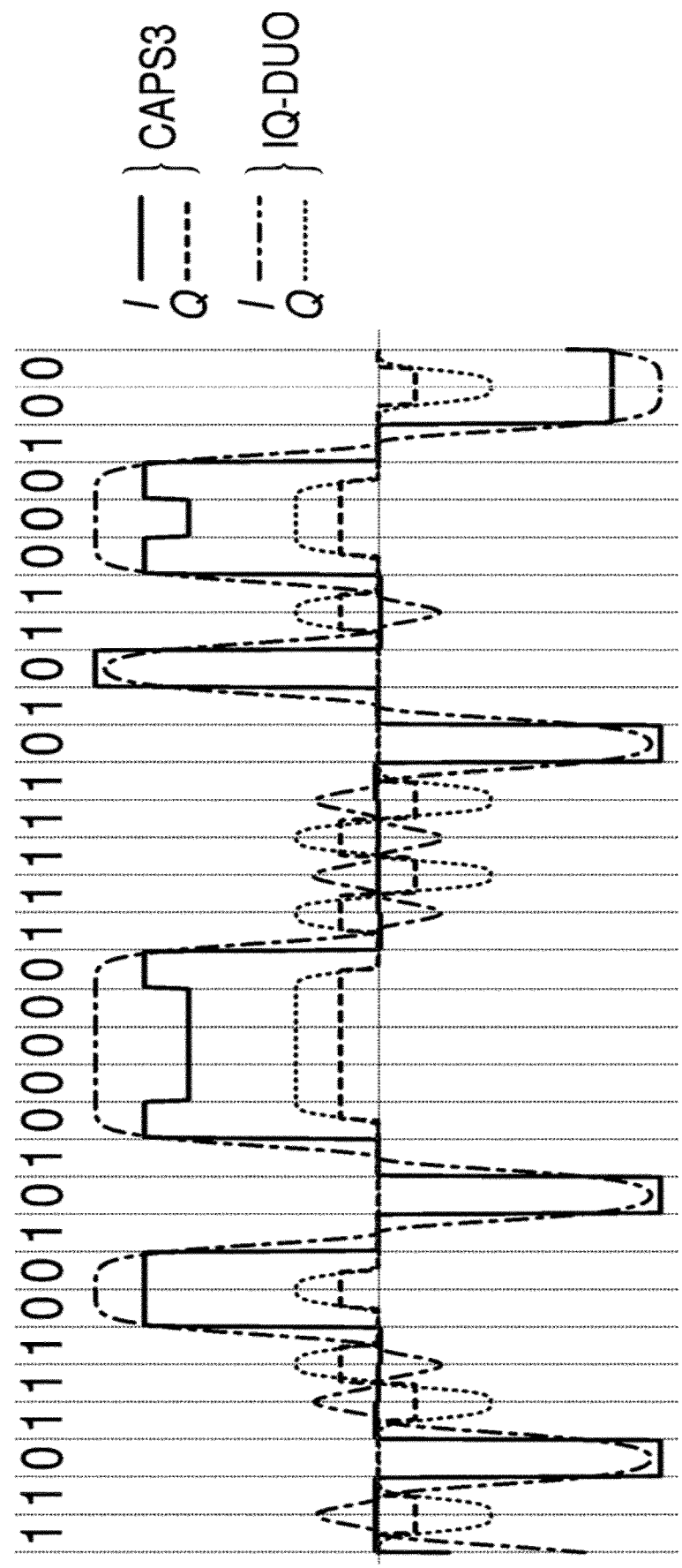
FIG. 10 shows I and Q waveforms for a conventional CAPS-3 encoder overlaid with the I and Q waveforms for an embodiment

FIG. 10 shows a time chart showing the I and Q waveforms for a conventional CAPS-3 encoder overlaid with the I and Q waveforms for an embodiment of this disclosure, labelled IQ-DUO in the figure. At the top of the chart is a binary digital representation of an input signal. The signals are duobinary in that alternate pulses on the first signal (I) are positive and negative-going, and the second (Q) signals show both positive and negative going pulses. The pulses of the second (Q) signal are shown going in the same direction as corresponding pulses of the first signal. The CAPS-3 I waveform has a detail in that it has multiple levels at its positive peaks wherever the pulse has a duration of more than 2T, and this detail is not reproduced in the IQ-DUO waveform, simulating the CAPS-3 waveform. Also, the IQ-DUO I waveform shows some oscillation about the zero amplitude not shown by the CAPS-3 I waveform. Otherwise, in most important features, the IQ-DUO waveforms generally show a good simulation of CAPS-3 waveforms.

Figure 11:
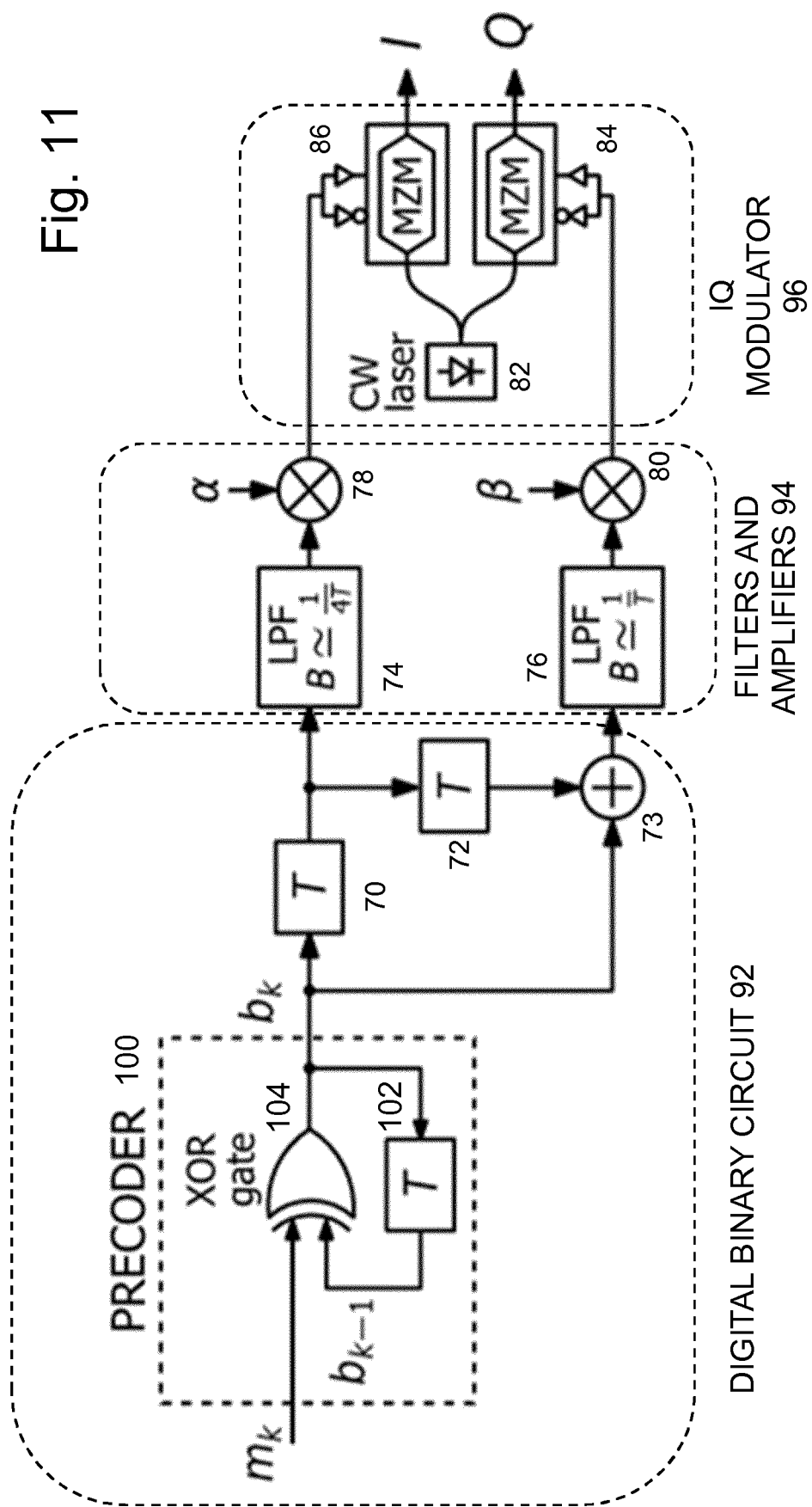
FIG. 11 shows a schematic view of apparatus according to an embodiment having electrical domain signals and a precoder.

FIG. 11 shows another schematic view of an embodiment using first and second signals in the electrical domain, similar to the view of FIG. 7. In this case a precoder 100 is shown for preprocessing a binary input signal to provide a differential binary data stream. This is a conventional precoder circuit, other designs are known, and the purpose is to avoid a single transmission bit error propagating endlessly. In principle the advantages of the simpler encoding apply with or without the precoder. The precoder has a XOR gate 104 and a feedback path around the XOR gate via a delay element 102 providing a delay of duration T. Otherwise the circuitry is similar to that of FIG. 7 and similar reference numerals have been used as appropriate. In FIG. 11 the apparatus is shown as having three separate modules. One is a digital binary circuit 92 including the precoder, delays and adder. A second module 94 has the filters and amplifiers, and a third module 96 has the IQ modulator.

Figure 12:
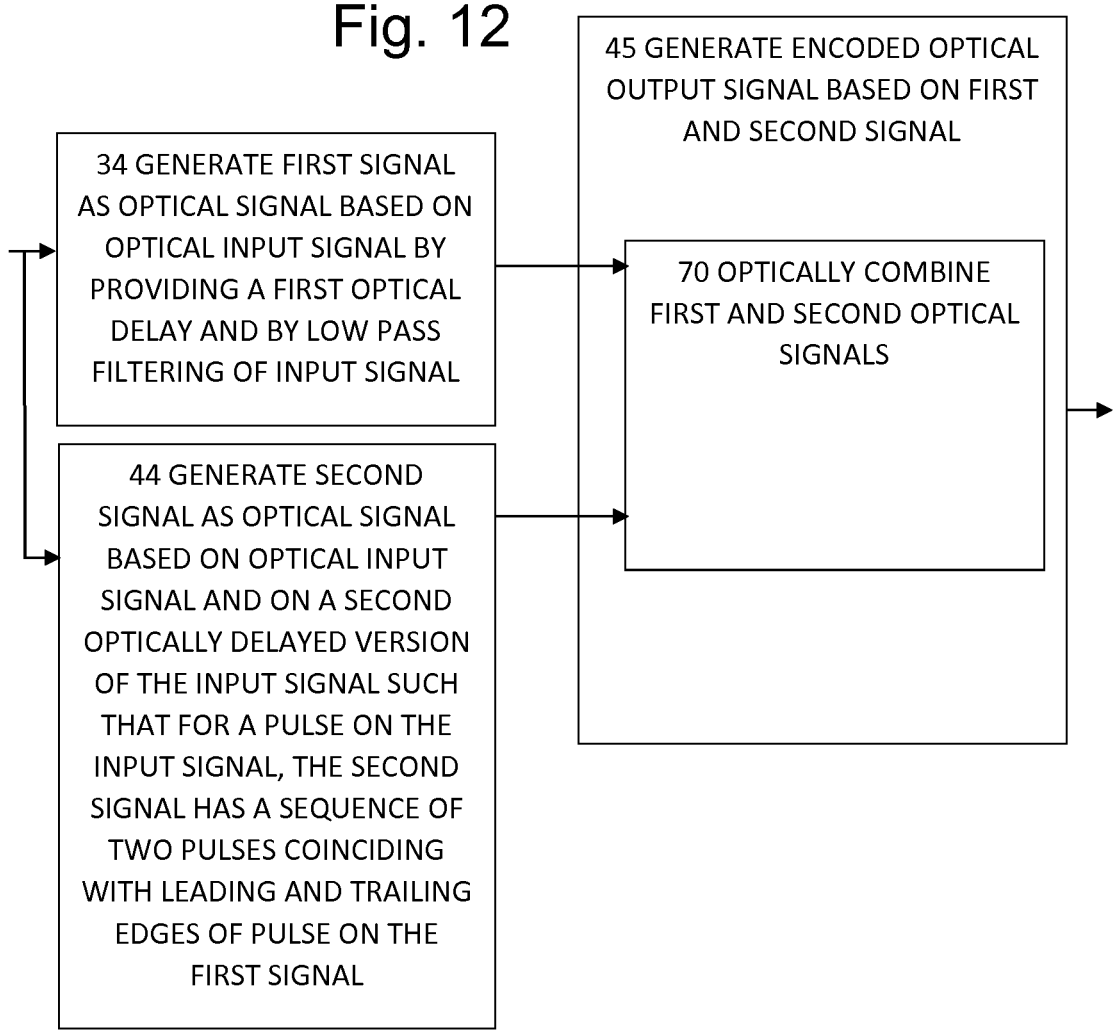
FIG. 12 shows a method according to an embodiment having optical domain signals.
Figure 13:
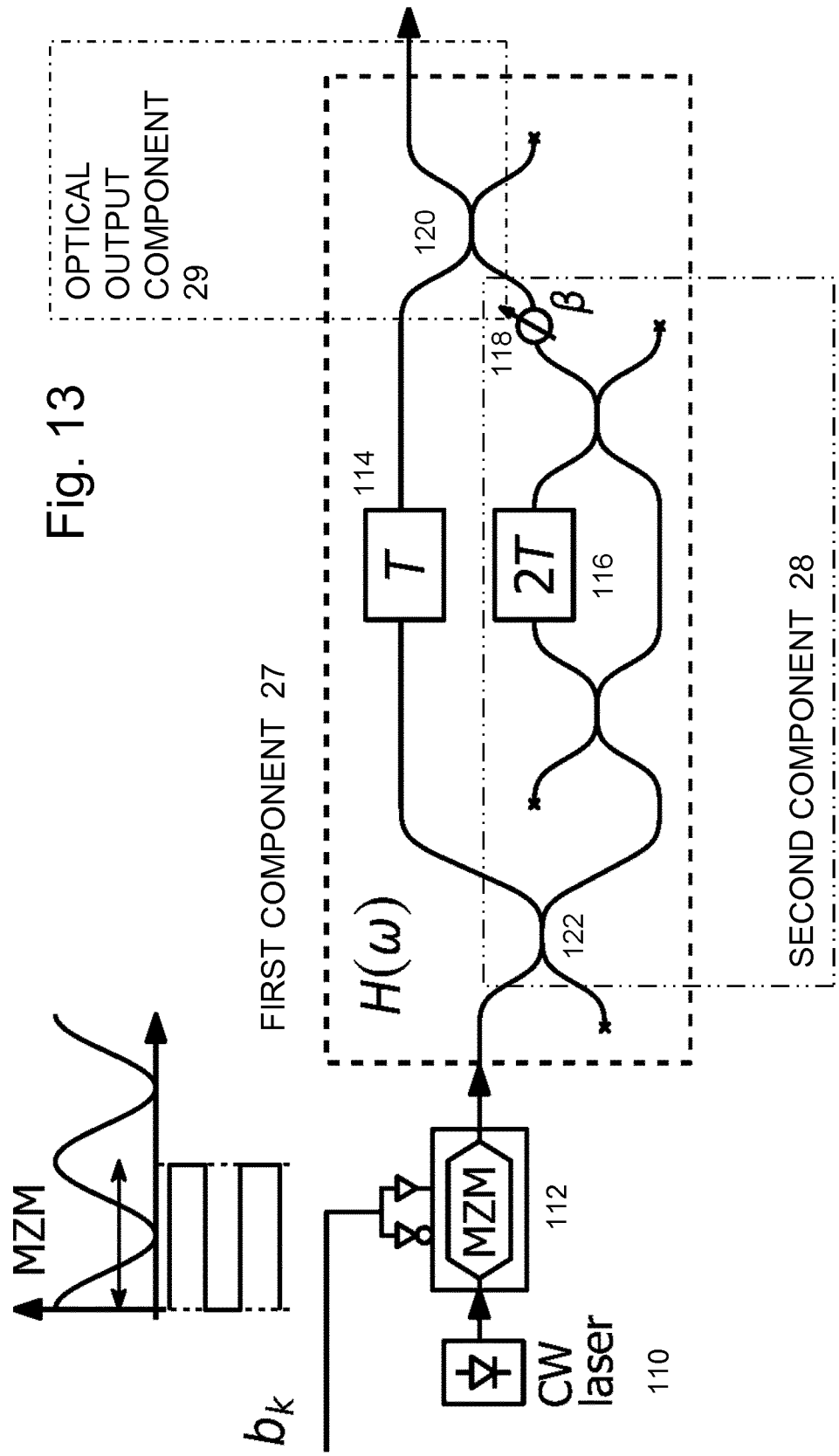
FIG. 13 shows a schematic view of apparatus according to an embodiment having optical domain signals.

FIGS. 12 and 13. Optical Domain Embodiment

FIG. 12 shows similar steps to those of FIG. 3, but limited explicitly to an example in which the first and second signals are optical signals, and these two optical signals are not used to modulate I and Q inputs of an IQ modulator, but can simply be combined optically to generate the encoded optical output. Hence there is shown a step 34 for generating the first signal as an optical signal based on the input signal by providing a first optical delay and by low pass filtering in the optical domain. Such optical low pass filtering can be implemented either by the inherent narrow band frequency response of an interferometer, or by a separate optical filter element at some point in the optical path, or both.

A step 44 is provided for generating the second signal as an optical signal based on the input signal and on a second delayed version of the input signal in the optical domain. As before, the second signal is generated such that in response to a pulse on the input signal, the second signal has a sequence of two pulses coinciding with the leading and trailing edges of the corresponding pulse on the first signal. The step of generating the encoded output signal has a step 70 of optically combining the first and second optical signals. This can be implemented by a recombining part of an interferometer for example.

FIG. 13 shows an apparatus for encoding according to another embodiment which can be used to implement the optical domain operations described above with respect to FIG. 12. The input signal is converted to an optical input signal by a modulator such as an MZM 112, coupled to an optical source such as a CW laser 110. The figure shows a waveform of the modulator output, showing it has lowest optical amplitude at the midpoint of the input range. The apparatus for encoding has nested interferometers with different delays. The first component 27 has a first interferometer having a first splitter 122 for dividing an optical path into two branches. An optical delay 114 of delay T is provided in one branch, and the branches are recombined by coupler 120. Contained in its other branch is a second interferometer itself having a second optical delay 116 of duration 2T in one sub-branch and an uninterrupted path in its other sub-branch. The optical input signal is fed into one end of these nested interferometers, is divided by splitter 122, so that half of the signal is fed to optical delay 114 and the first optical signal will appear at the output of optical delay 114.

The other half of the optical input signal is fed to the second interferometer. This divides the other half of the optical input signal so that a quarter part goes to the optical delay 116 and serves to generate the second delayed version. This is combined with the quarter part which reaches the other branch of the second interferometer. These two quarter parts are recombined at the output of the second interferometer to provide the second optical signal. An optical attenuator 118 (or amplifier) is provided on either the path of the first optical signal or the second optical signal to alter a relative amplitude of the two signals. Then the first and second optical signals are combined by the recombiner 120 of the first interferometer to form the encoded optical output.

In summary, the optical front-end splits the optical signal in two branches. A bit time delay line is present on the first branch. On the second branch, the signal is further split in two sub-branches and delayed twice the bit time on one of the sub-branches. The sub-branches are then recombined in one only branch, where a variable optical attenuator is placed. Finally, the second branch is recombined with the first one. The optical front-end is fed by the input optical signal in the form of a pre-coded duobinary optical signal. The first component 27 is formed by parts of the first interferometer (that also realise the low pass filtering) and the first optical delay 114. The second component is formed by the second interferometer, and optionally parts of the first interferometer if this applies some low pass filtering to the second optical signal. The optical output component for combining the first and second optical signals is formed by the recombiner 120 of the first interferometer.

Hence this optical domain embodiment has features which correspond and has operational steps which correspond closely to the electrical domain version. The waveforms of the first and second optical signals combined by recombiner 120, can correspond to those shown in FIG. 10. In practice the optical front-end could be realized in silicon photonics, further simplifying the encoder and modulator. Notably the modulator is now a common optical modulator, based on a MZM, instead of an IQ modulator. This can be easier and cheaper to realise as there are fewer optical ports requiring to be controlled. A drawback of this optical domain implementation is the use of the optical delay lines (currently they would typically be implemented by relatively long waveguides that introduce insertion loss).

FIG. 14. Front Haul Transmission System

FIG. 14 shows a schematic view of an example of an optical transmission system. In this case the optical optical transmission is for front-haul between a radio terminal (e.g. RRU) 200 and a baseband processing unit 210. This is a particularly cost sensitive application where the currently available coding schemes are either too complex and thus expensive, or too short range (up to 20 km is needed, without repeaters and without external dispersion compensation). The radio terminal has a transmitter 220 which has apparatus 240 for encoding according to any of the examples described above. The apparatus for encoding feeds an optical output signal onto an optical transmission path. This is received by a direct detection receiver 230 at the baseband processing unit. The receiver has apparatus 250 for decoding. This is a two way transmission so there is a (optionally separate) optical transmission path in the other direction from the baseband processing unit to the radio terminal. Hence the baseband processing unit has a transmitter 220 with apparatus 240 for encoding. Equally the radio terminal has a direct detection receiver 230 coupled to the apparatus 250 for decoding. Hence this figure shows an example of transmitting the encoded optical output signal to a receiver and using direct detection at the receiver to receive the optical transmission. The cost saving of not needing coherent receivers is particularly useful.

FIG. 15. Program Example

Any electrical domain circuitry can in principle be implemented by a processing circuit running a program. FIG. 15 shows an example of apparatus for encoding including a processing circuit 320, coupled to a storage medium in the form of a memory circuit 330 having a stored program 325. Hence this is an example of computer program for encoding a signal for optical transmission, the computer program comprising computer code which, when run on processing circuitry of an encoding apparatus, causes the encoding apparatus to carry out any of the method steps described above for generating the first or second signals in the electrical domain, for encoding the input signal for optical transmission. It is also an example of a computer program product comprising a computer program and a computer readable storage medium on which the computer program is stored. The storage may also comprise persistent storage, which, for example, can be any single one or combination of magnetic memory, optical memory, solid state memory or even remotely mounted memory. Other variations can be envisaged within the claims. Aspects of the disclosure provide an apparatus for encoding an input signal for optical transmission. The apparatus comprising the processing circuitry. The processing circuitry being configured to cause the apparatus to carry out the method or functions of any example. For example, the processing circuitry is configured to: generate a first signal based on the input signal by providing a first delay, and by low pass filtering of the input signal, generate a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and generate an encoded optical output signal based on the first signal and the second signal.

The invention claimed is:

1. A method of encoding for optical transmission of an input signal, comprising:
generating a first signal based on the input signal by providing a first delay, and by low pass filtering of the input signal,
generating a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and
generating an encoded optical output signal based on the first signal and the second signal.

2. The method of claim 1, wherein the first signal and the second signal comprise first and second electrical signals and the step of generating based on the first signal and the second signal comprises modulating an I input of an IQ modulator according to the first electrical signal and modulating a Q input of the IQ modulator according to the second electrical signal, to provide the encoded optical output signal for transmission.

3. The method of claim 1, wherein the first and second signals have waveforms simulating I and Q waveforms of a CAPS-3 encoder.

4. The method of claim 1, wherein the step of generating the second signal comprises adding the input signal to the second delayed version of the input signal.

5. The method of claim 1, wherein for the steps of generating the first and second signals, the second delay is twice the duration of the first delay.

6. The method of claim 1, wherein for the steps of generating the first and second signals, the first delay is one symbol time of the input signal.

7. The method of claim 1, having a step of altering a relative amplitude of the first and second signals before the step of generating the encoded optical output signal based on the first signal and the second signal.

8. The method of claim 1, the generating of the first and second signals being such that in response to multiple pulses on the input signal, the corresponding pulses of the first signal are alternately positive-going and negative-going, and the corresponding two pulses of the second signal go in the same direction as those of the first signal.

9. The method of claim 1, the low pass filtering having a pass band up to ¼T where T is a symbol time of the input signal.

10. The method of claim 1, the step of generating the second signal comprises using a low pass filtered version of the input signal.

11. The method of claim 10, the low pass filtering having a pass band up to 1/T where T is a symbol time of the input signal.

12. The method of claim 1 wherein the first and second signals comprise first and second optical signals, and there is a step of using a modulator to generate an optical input signal from the input signal,
wherein the step of generating the first signal comprises using a first optical delay for delaying the optical input signal,
wherein the step of generating the second signal comprises generating the second optical signal based on the optical input signal and based on a second delayed version having a second optical delay longer than the first optical delay, such that in response to a pulse on the input signal, the second optical signal has a sequence of two pulses, the two pulses coinciding respectively with leading and trailing edges of a corresponding pulse on the first optical signal, and
wherein the step of generating the encoded optical output signal is based on optically combining the first optical signal and the second optical signal.

13. The method of claim 12, having the step of using nested interferometers to generate the first and second optical signals, and to combine the first and second signals.

14. The method of claim 12, when dependent on claim 7, and wherein the step of altering a relative amplitude of the first and second signals comprises optically changing a relative amplitude of the first optical signal and the second optical signal.

15. The method of claim 1, the optical transmission being for front-haul between a radio terminal and a baseband processing unit.

16. The method of claim 1 and having subsequent steps of transmitting the encoded optical output signal to a receiver and using direct detection at the receiver to receive the optical transmission.

17. Apparatus for encoding an input signal for optical transmission, the apparatus comprising:
a first component configured to generate a first signal based on the input signal by providing a first delay, and by low pass filtering the input signal,
a second component configured to generate a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and
an optical output component configured to generate an encoded optical output signal based on the first signal and the second signal.

18. The apparatus of claim 17 wherein the first component and the second component comprise first and second electrical circuitry, the first and second signals comprise first and second electrical signals, and the optical output component comprises an IQ modulator configured such that an I input of the IQ modulator is modulated according to the first electrical signal and a Q input of the IQ modulator is modulated according to the second electrical signal, to provide the encoded optical output signal for transmission.

19. The apparatus of claim 17, wherein the first and second components are configured to generate first and second signals having waveforms simulating I and Q waveforms respectively of a CAPS-3 encoder.

20. The apparatus of claim 17, the second component also being configured to generate the second signal by adding the input signal to the second delayed version of the input signal.

21. The apparatus of claim 17 the second component being configured to generate the second delayed version based on the second delay being twice the duration of the first delay.

22. The apparatus of claim 17, the first component being configured to generate the first signal based on the first delay being one symbol time of the input signal.

23. The apparatus of claim 17, having a third component configured to alter a relative amplitude of the first and second signals before they are used to generate the encoded optical output signal.

24. The apparatus of claim 17, and the first and second components being configured to generate the first and second signals such that in response to multiple pulses on the input signal, the corresponding pulses of the first signal are alternately positive-going and negative-going, and the corresponding two pulses of the second signal go in the same direction as those of the first signal.

25. The apparatus of claim 17, the low pass filtering having a pass band up to $\frac{1}{4}T$ where T is a symbol time of the input signal.

26. The apparatus of claim 17, the second component being configured to use a low pass filtered version of the input signal for generating the second signal.

27. An optical transmission system comprising a transmitter and a receiver, the transmitter having the apparatus of claim 17.

28. A computer program product comprising a computer readable storage medium on which a computer program is stored, the computer program comprising computer code which, when run on processing circuitry of an encoding apparatus, causes the encoding apparatus to:
generate a first signal based on the input signal by providing a first delay, and by low pass filtering of the input signal,
generate a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and
generate an encoded optical output signal based on the first signal and the second signal.

29. Apparatus for encoding an input signal for optical transmission, the apparatus comprising processing circuitry; the processing circuitry being configured to cause the apparatus to:
generate a first signal based on the input signal by providing a first delay, and by low pass filtering of the input signal,
generate a second signal based on the input signal and based on a second delayed version of the input signal having a second delay larger than the first delay, such that in response to a pulse on the input signal, the second signal has a sequence of two pulses, the two pulses coinciding respectively with leading and trailing edges of a corresponding pulse on the first signal, and
generate an encoded optical output signal based on the first signal and the second signal.

* * * * *